(12) United States Patent
Suzuki et al.

(10) Patent No.: US 7,047,237 B2
(45) Date of Patent: May 16, 2006

(54) SYSTEM AND METHOD FOR CHECKING DATA STORED IN DATABASE SYSTEM USED FOR PART MANAGEMENT

(75) Inventors: Kazunori Suzuki, Saitama (JP); Masataka Yamamoto, Saitama (JP); Hideyuki Tanaka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 25 days.

(21) Appl. No.: 10/376,722

(22) Filed: Feb. 28, 2003

(65) Prior Publication Data

US 2003/0187534 A1  Oct. 2, 2003

(30) Foreign Application Priority Data

Mar. 26, 2002  (JP) ............................. 2002-087195

(51) Int. Cl.
 *G06F 17/30* (2006.01)
(52) U.S. Cl. ..................... 707/3; 707/103; 707/200; 700/107
(58) Field of Classification Search ................. 700/95, 700/97, 80, 100, 103, 115, 108, 109, 182, 700/107; 707/1, 3, 103, 2, 200
See application file for complete search history.

(56) References Cited

U.S. PATENT DOCUMENTS

| | | | |
|---|---|---|---|
| 5,119,307 A | | 6/1992 | Blaha et al. |
| 5,202,836 A | | 4/1993 | Iida et al. |
| 5,742,288 A | | 4/1998 | Nishizaka et al. |
| 5,777,877 A | | 7/1998 | Beppu et al. |
| 5,822,210 A | * | 10/1998 | Kobayashi et al. ......... 700/121 |
| 5,838,965 A | * | 11/1998 | Kavanagh et al. ...... 707/103 R |
| 5,864,875 A | * | 1/1999 | Van Huben et al. ........ 707/200 |
| 6,438,535 B1 | | 8/2000 | Benjamin et al. |
| 6,185,476 B1 | * | 2/2001 | Sakai ......................... 700/182 |
| 6,223,094 B1 | | 4/2001 | Muehleck et al. |
| 6,256,549 B1 | | 7/2001 | Romero et al. |
| 6,557,002 B1 | | 4/2003 | Fujieda et al. |
| 6,662,179 B1 | | 12/2003 | Benjamin et al. |
| 2001/0007997 A1 | | 7/2001 | Fujieda et al. |
| 2001/0016803 A1 | | 8/2001 | Sartimo et al. |
| 2002/0032611 A1 | | 3/2002 | Khan |
| 2003/0004988 A1 | * | 1/2003 | Hirasawa et al. ........... 707/502 |
| 2003/0055812 A1 | | 3/2003 | Williams et al. |
| 2003/0187870 A1 | | 10/2003 | Nakajima et al. |
| 2003/0212766 A1 | | 11/2003 | Giles et al. |
| 2004/0098292 A1 | | 5/2004 | Miller et al. |

FOREIGN PATENT DOCUMENTS

| | | |
|---|---|---|
| EP | 0 467 257 A2 | 1/1992 |
| EP | 0 895 170 A2 | 2/1999 |
| GB | 2234097 | 1/1991 |
| GB | 2364801 | 2/2002 |
| JP | 09-204449 | 8/1997 |
| JP | 10-124550 | 5/1998 |
| JP | 2001-022811 | 1/2001 |
| JP | 2002-073708 | 3/2002 |
| WO | WO 03/038688 | 5/2003 |

\* cited by examiner

*Primary Examiner*—Leo Picard
*Assistant Examiner*—Charles Kasenge
(74) *Attorney, Agent, or Firm*—Carrier, Blackman & Associates, P.C.; Joseph P. Carrier; William D. Blackman

(57) ABSTRACT

A parts management system used for parts management of part of an apparatus is composed of a database system including one or more databases, and a data check computer system. The database stores data on the parts, the data including an electronic parts list describes part numbers of the parts. The data check computer system checks whether the data stored in the at least one database complies with a predetermined rule and produces a warning in response to the check.

27 Claims, 9 Drawing Sheets

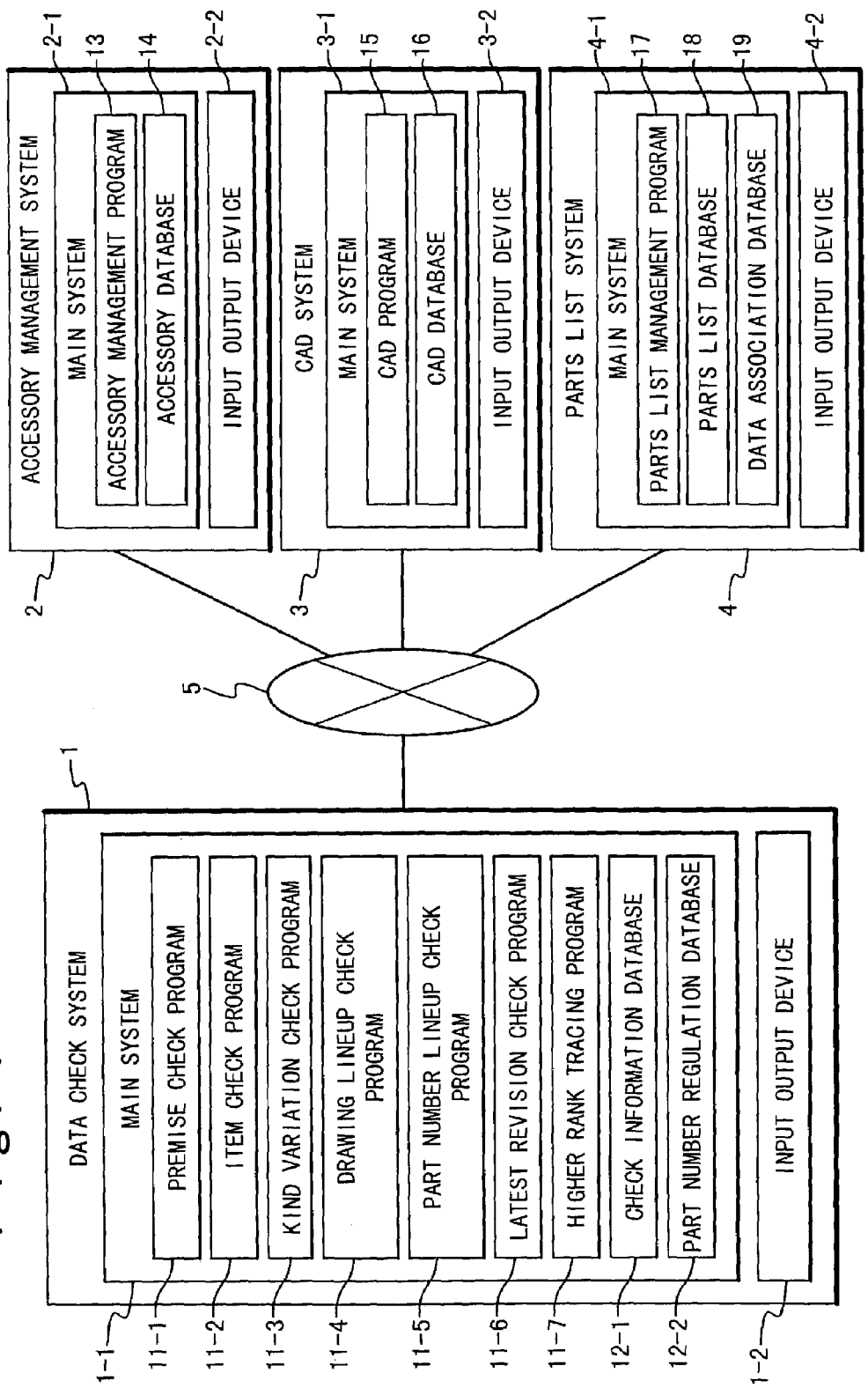

| No. | RANK | STATE | PARTS CONFIGURATION | NAME OF ITEM OR PART | QTY | MATERIAL | THICKNESS OF PLATE | WT (Kg) |
|---|---|---|---|---|---|---|---|---|
|   |   |   | ⊞--F01 20000 | T/F TEST |   |   |   |   |
| 1 |   | F | ⊟--F01 20001 | TEST |   |   |   |   |
| 2 |   | D | ⊟--20001-TGHA-A000 | TEST |   |   |   | 0.0 |
|   |   |   | ⊟--20001-TGHA-B000 | TEST | 2 |   |   | 0.0 |
| 1 |   | C | ⊟--F01 20002 | TEST |   |   |   |   |
| 2 |   | D | ⊟--20002-TGHA-A000 | TEST | M |   |   | 0.0 |
| 1 |   | C | ⊟--20002-TGHA-ZZ00 | TEST |   |   |   | 0.0 |
| 1 |   | C | ⊟--F01 20003 | TEST |   |   |   |   |
| 2 |   | D | ⊟--20003-TGHA-B000 | SPEC | M |   |   | 0.0 |
| 1 |   | F | ⊟--F01 20004 | TEST |   |   |   |   |
| 2 |   | D | ⊟--20004-TGHA-A000 | SPEC L1 |   |   |   | 0.0 |
| 1 |   | G | ⊟--20004Z-TGHA-A000 | SPEC |   |   |   |   |
|   |   |   | ⊟--F01 20005 | TEST |   |   |   |   |
| 1 |   | B | ⊟--20005-TGHA-0000 | SPECC | M |   |   | 0.0 |
| 2 |   | B | ⊟--F01 20006 | SPEC |   |   |   | 0.0 |
|   |   |   | ⊟--2005Z-TGH-0000 |   |   |   |   |   |

Fig. 8

| 85 | 86 | 87 | 88 | 89 | 90 | 91 | 92 | 93 | 94 |
|---|---|---|---|---|---|---|---|---|---|
| RANK | STATUS | ITEM CODE | NAME OF ITEM | PART NUMBER | NAME OF PART | PART APPLICATION | PART PROPERTY | CONFIGURATION CODE | CONSTITUENT PART NUMBER |
|  |  |  |  |  |  |  |  |  |  |

75

SYSTEM AND METHOD FOR CHECKING DATA STORED IN DATABASE SYSTEM USED FOR PART MANAGEMENT

BACKGROUND OF THE INVENTION

1. Field of the Invention

The present invention relates, in general, to a system and method for part management, and more particularly, to a system and method for checking data stored in a database system used for the part management.

2. Description of the Related Art

Designing a product constituted by a large number of parts, such as an automobile, requires appropriate parts management. Large number of parts forces manufactures to deal with a large amount of information on the parts, and thus efficient parts management is helpful to design that product.

Parts management is often achieved by an electronic parts list system. An exemplary parts list system includes one or more databases that store an electronic parts list and drawings of the associated parts. The electronic parts list typically includes a list of items that constitute an apparatus, a list of parts that constitute each of the items, number of parts, part-specific information that typically includes a history of revision of designs of the specific part, a manner of installation of each part, and so on. The drawings, which show the configurations of the parts, are usually attached with various information, such as respective names of items and parts, and a list of parts that constitutes each of the items and the parts shown in the drawings. The attached information is used for parts management.

Efficient parts management requires necessary data to be surely stored according to a predetermined role in a database(s) used for the parts management. Lack of data necessary for parts management hinders efficient parts management. Therefore, the existence of the necessary data in the database(s) is desirably checked.

Especially, the conformity of part numbers in the databases is of much importance. The part number associates various data to the parts, and a wrong part number hinders efficient parts management.

Therefore, the conformity of data on the parts, especially part numbers, is desirably checked. However, a large number of the parts make it difficult to check the conformity of the data.

A need exists to provide a system and method for checking the data in a database system used for the part management.

SUMMARY OF THE INVENTION

Therefore, an object of the present invention is to provide a system and method for rapidly and correctly checking the conformity of data on parts, especially part numbers, stored in a database system used for the part management.

In an aspect of the present invention, a parts management system used for parts management of parts of an apparatus is composed of a database system including at least one database, and a data check computer system. The databases stores data on the parts, the data including an electronic parts list describing part numbers of the parts. The data check computer system checks whether the data stored in the at least one database complies with a predetermined rule and produces a warning in response to the check.

It is advantageous if the data check computer system includes a part number regulation database describing a part number regulation, and determines whether the part numbers of the parts in the electronic parts list are described according to the part number regulation to produce the warning.

It is advantageous if the parts are provided with ranks for hierarchical management, the database system includes an accessory management computer system for managing accessories of the apparatus, the accessory management computer system contains a variation-specific parts list which includes part numbers of variation-specific parts constituting a variation-specific accessory which is equipped for a variation of the apparatus to distinguish the variation from another variation of the apparatus, and the data check computer system looks up data on the variation-specific parts in the electronic parts list using the part numbers of the variation-specific parts as a query and determines whether the variation-specific parts is provided with the highest rank in the electronic part list to produce the warning.

It is advantageous if each of the part numbers of the parts includes at least one kind-specifying digit representative of a kind thereof, the parts listed in the database system are packaged into a plurality of packages, and the data check computer system determines whether parts having part numbers including the same kind-specifying digit are included in different packages to produce the warning.

When the database system includes a CAD database storing drawings of specific ones of the parts, and the drawings are respectively provided with drawing numbers which includes a specific part number of the part, the data check computer system preferably determines whether the database system contains a complete set of the drawings based on the drawing numbers to produce the warning.

It is advantageous if the electronic parts list is composed of a part number section describing part numbers of the parts and a constituent part number section describing constituent part numbers of constituent parts of the parts, and the data check system determines whether the part number section includes each of the constituent part numbers to produce the warning.

It is advantageous if the part numbers of the parts respectively include at least one version-specifying digit identifying a revised version of a specific part of the parts, and the data check computer system queries an old version part number that is identical to a latest version part number of the latest version of the specific part except the at least one version-specifying digit, and deletes data on an old version of the specific part associated to the old version part number from the electronic parts list.

When the electronic parts list includes a part number section describing part numbers of the parts and a constituent part number section describing constituent part numbers of constituent parts of the parts, and each of the parts is provided with ranks such that each of the parts are provided with higher ranks than the constituent parts thereof, the data check system preferably produces a part number structure describing relations of the parts and the constituent parts thereof based on the part number section and the constituent part number section, and checks whether the part number structure correctly forms a tree to produce the warning.

In this case, the data check computer system preferably traces the relations from each of the parts to determine whether each of the parts is associated through the relations to the highest rank part whose rank is the highest rank to produce the warning.

Also, the data check computer system preferably produces the warning when one of the parts is not associated to the highest rank part through a predetermined number or fewer of the relations.

In another aspect of the present invention, a method for part management of parts of an apparatus comprises the steps of:
preparing at least one database storing data on the parts, the data including an electronic parts list describing part numbers of the parts;
automatically checking whether the data stored in the at least one database complies with a predetermined rule by a data check computer system; and
producing a warning in response to the checking.

In still another aspect of the present invention, a computer-readable program is composed of:
at least one database storing data on parts, the data including an electronic parts list describing part numbers of the parts;
a data checker which automatically checks whether the data stored in the at least one database complies with a predetermined rule; and
an alarm section which produces a warning in response to the checking.

BRIEF DESCRIPTION OF THE DRAWINGS

FIG. 1 shows a part management system in an embodiment of the present invention;
FIG. 2A shows an accessory specification table representative of a mapping from type codes and model codes to specifications of automobiles;
FIG. 2B shows a product variation table representative of a mapping from type codes and variation codes to accessories;
FIG. 5 shows an exemplary screen image produced on the basis of the part drawing data stored in a CAD database;
FIG. 7 shows an exemplary screen image produced on the basis of an electronic parts list;
FIG. 8 shows the electronic parts list.

DETAILED DESCRIPTION OF THE PRESENT EMBODIMENTS

Figure 3A:
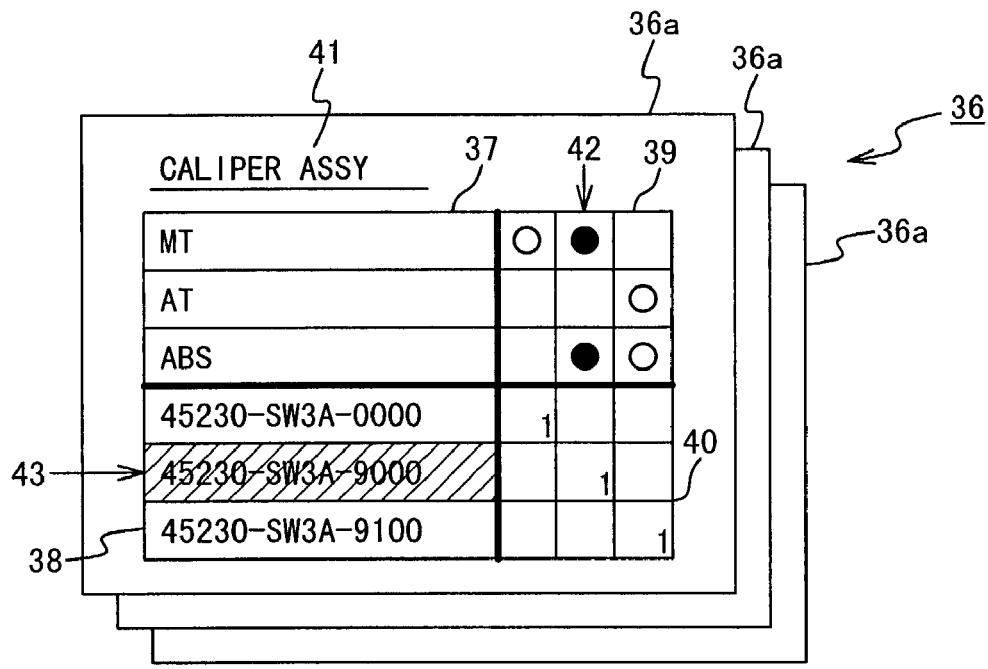
FIG. 3A shows a variation-specific parts list describing the association of variation-specific accessories to necessary parts.

The system and method according to the present invention will be described below in detail with reference to the attached drawings.

FIG. 1 shows a part management system in an embodiment of the present invention, which is used for part management of automobiles.

The part management system is provided with a data check system 1, an accessory management system 2, a CAD (computer aided design) system 3 and a parts list system 4. Conventional computer systems, such as workstations, may be used as the data check system 1, the accessory management system 2, the CAD system 3, and the parts list system 4. The data check system 1, the accessory management system 2, the CAD system 3, and the parts list system 4 are interactively connected to each other through the network 5.

The network 5 may be a private network, such as an LAN (Local Area Network), or a public network, such as the Internet. The accessory management system 2 is used for the management of accessories of automobiles. The CAD system 3 provides the user with a CAD platform to design automobile parts. The parts list system 4 provides the user with an electronic parts list that describes various data on parts. The accessory management system 2, the CAD system 3 and the parts list system 4 respectively include databases for the part management to constitute a database system. The data check system 1 checks data stored in the databases with respect to the conformity of the data, especially, the conformity of part numbers.

In the part management system, automobile parts are managed in a predetermined regulation. According to the regulation, the automobile parts are managed in a hierarchical fashion. An automobile is composed of accessories, and each of the accessories is composed of a plurality of items, and each of the items is composed of a plurality of parts. A part may be constituted by a plurality of parts. A set of parts that constitutes a specific part may be referred to as constituent parts of the specific part. The item codes are respectively assigned to the items, and part numbers are respectively assigned to the automobile parts.

Part numbers of the parts are to be assigned according to a predetermined regulation to facilitate the hierarchical parts management. The part number regulation requires that the part number of a part shall include a portion of the item code of the item that includes the part. This allows the association of the part to the item to be easily comprehensible.

The part numbers respectively include one or more kind-specifying digits and one or more version-specifying digits. The kind-specifying digits represent the kinds of the respective parts. The version-specifying digits represent version codes of the parts. The design of a part may be revised during the design of an automobile. When the design of a part is revised, the version-specifying digits are modified to assign a new part number to the revised part.

The automobile parts are respectively provided with ranks. The ranks are representative of the positions of the associated parts in the part hierarchy. A part that has a certain rank may composed of parts that have the next lower rank, and each of the parts that have the next lower rank may be composed of parts that have the second next lower rank.

A set of parts that are closely related to each other are packaged into a "package". The part management system may execute data processing (e.g. data look up in databases) by package. In this embodiment, a package is defined by item. That is, a set of parts associated to a package constitute a complete item. Packages are identified by package numbers.

The part number regulation requires that two ore more parts of the same kind shall not be included in different packages. That is, a set of parts whose part numbers include the same kind-specify digits are prohibited from being included in different packages.

The provision of the data check system 1 is quite practical, because human errors are inevitable. User's mistake or improper data input may result in errors such as lack of necessary data, and wrong assignment of part numbers. Such errors may interfere with the appropriate parts management. The data check system 1 checks the conformity of data, including the part numbers, stored in the databases.

The data check system 1, the accessory management system 2, the CAD system 3, and the parts list system 4 will be explained below in detail.

Accessory Management System

The accessory management system 2 is composed of a main system 2-1 and an input output unit 2-2. The main system 2-1 includes a CPU (central processing unit) and a memory unit storing an accessory management program 13 and an accessory database 14. The accessory management program 13 describes a procedure of the management of accessories that are equipped for automobiles, and the accessory management system 2 operates on the basis of the accessory management program 13. The accessory database 14 is used for the management of the accessories.

The accessory management system 2 uses model codes, type codes and specifications of the associated automobiles, which are received through the input output unit 2-2. Automobiles are classified according to the model codes which are representative of the models thereof. Furthermore, automobiles that have a common model code may be classified according to the type codes which are representative of the types thereof. Automobiles that have different model codes and/or type codes may differ in the equipment, that is, include different accessories.

The accessory management program 13 generates an accessory specification table describing the association of the type codes and the model codes to the specifications of the automobiles specified thereby. The accessory specification table is stored in the accessory database 14.

FIG. 2A shows the accessory specification table, which is denoted by the numeral 26. The accessory specification table 26 describes accessories to be equipped for an automobile identified by a model code and a type code.

In detail, the accessory specification table 26 includes a model section 27, a type section 28, an accessory section 29, and a check section 30. The model section 27 is representative of model codes. In FIG. 2A, model codes "A" and "B" are illustrated in the model section 27.

The type section 28 is representative of type codes. In FIG. 2A, type codes "20E", "20T and "25T" are illustrated in the type sections 28.

The accessory section 29 is representative of accessories that may be equipped for automobiles. As shown in FIG. 2A, the accessories may include an MT (manual transmission), an AT (automatic transmission), an SRS (supplemental restraint system) or an air bag, an ABS (antilock break system), a C/C.

The check section 30 is representative of accessories to be equipped for the automobiles identified by the model codes and type codes. For example, a portion of the check section 30 associated to the model code "A" and the type code "20E" includes circles in the fields associated to "MT" and "SRS". The circles indicate that an automobile identified by the model code "A" and the type code "20E" is equipped with a manual transmission (MT) and a supplemental restraint system (SRS). The symbol "F" in the check section 30 indicates that the associated accessory is an option with respect to the associated model and type.

The accessory management program 13 generates a product variation table describing the association of production variation codes and the type codes to the accessories to be equipped for automobiles. Automobiles that have the same model code and type code may include product variations, that is, may be equipped with different combinations of accessories. The possible product variations are identified by product variation codes, which are determined by the user according to a predetermined regulation. The product variation codes are determined so that different product variation codes are assigned to product variations that have the same type code. The accessory variation table 31, which describes accessories to be equipped for each of the variations, is generated on the basis of the accessory specification table 26.

The FIG. 2B shows the product variation table, which is denoted by the numeral 31. The accessory variation table 31 describes all the possible product variations, that is, all the possible combinations of accessories.

In detail, the product variation table 31 includes a type section 32, an accessory section 33, a product variation code section 34, and a check section 35.

The type section 32, which corresponds to the type section 28 in the accessory variation table 26 shown in FIG. 2A, is representative of the respective type codes associated to the product variations codes. It should be noted that FIG. 2B shows only the type codes and the product variation codes with respect to the model code "A".

The accessory section 33, which corresponds to the accessory section 29 in the accessory specification table 26, is representative of accessories that may equipped for automobiles.

The product variation code section 34 is representative of product variation codes. For example, product variation code section 34 describes that automobiles having the same type code "20T" include four variations specified by the production variation codes "21", "22", "31", and "32".

The check section 35 is representative of accessories to be equipped for an automobile that has a product variation number. A circle in the check section 35 represents the accessory to be equipped for an automobile that is identified by the associated type code and product variation code.

The accessory management program 13 defines variation-specific accessories, which determines the difference in the specifications of product variations, from among the accessories listed in the product variation table 31. A combination of variation-specific accessories that distinguish a product variation from other product variations may be referred to as a variation-specific accessory variation.

After determining the variation-specific accessories, the accessory management program 13 produces a variation-specific parts list. FIG. 3A shows the variation-specific parts list, which is denoted by the numeral 36. The variation-specific parts list 36 describes the association of variation-specific accessories to necessary parts for constituting the variation-specific accessories. It should be noted that FIG. 3A is not meant to be the actual structure of data relative to the variation-specific parts list 36, but rather to be the logical association of data relative to the variation-specific parts list 36.

In detail, the variation-specific parts list 36 includes a plurality of item sheets 36a. The item sheets 36a are respectively provided for items that are included in automobiles.

Each of the item sheets 36a includes an accessory section 37, a part number section 38, an accessory check section 39, parts check section 40, and an item name section 41.

The accessory section 37 represents the variation-specific accessories. The variation-specific accessories, which are determined by the accessory management program 13, are listed in the accessory section 37.

The part number section 38 represents part numbers of parts that are installed for one or more of the variation-specific accessories.

The accessory check section 39 describes all the possible combinations of variation-specific accessories. The possible combinations of the variation-specific accessories are represented by white and black circles.

The part number check section 40 describes necessary numbers of parts identified by the part numbers listed in the part number section 38 for the combinations of the variation-specific accessories listed in the accessory check section 39.

The item name section 41 is representative of the name of the item listed on the item sheet 36a.

The variation-specific parts list 36 is used for specifying necessary parts for a specific product variation.

The accessory management program 13 has a function to extract a product variation that includes a specific part when a part number thereof is given by the user through the input output unit 2-2.

The process of extracting the product variation begins with determining a combination of the variation-specific accessories associated to a part number with reference to the variation-specific parts list 36 shown in FIG. 3A. The product variation(s) associated to the specific part is then queried in the product variation table 31 using the combination of the variation-specific accessories as a key.

For example, let the part number "45230SW3A-9000", which is listed on a row 43, be given to the accessory management program 13. The black circles in the accessory check section 39 and the symbol "1" in the part number check section 40 depict that the part number "45230-SW3A-9000" is associated to the combination of "MT" and "ABS" listed in the column 42.

Figure 3B:
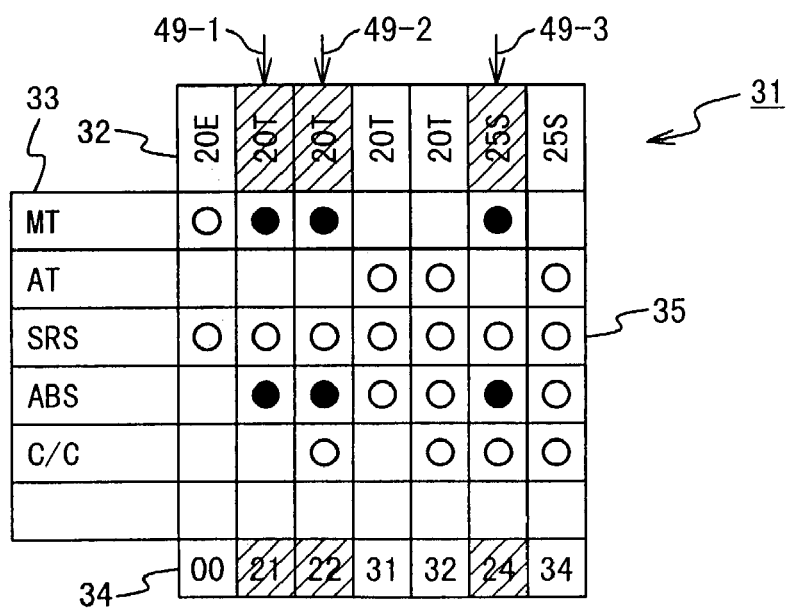
FIG. 3B shows a process of extracting a product variation.

As shown in FIG. 3B, the check section 35 depicst that the combination of "MT" and "ABS" is associated to four product variations identified by pairs of a type code and a product variation code (20T, 21) (20T, 22), and (25S, 24) which are respectively listed on columns 49-1 to 49-3. That is, the product variations identified by the type codes and the product variations, (20T, 21) (20T, 22), and (25S, 24) are extracted as being associated to the specific part identified by the part number "45230-SW3A-9000".

The accessory specification table 26, the product variation table 31, and the variation-specific parts list 36 are stored in the accessory database 14.

Figure 4:
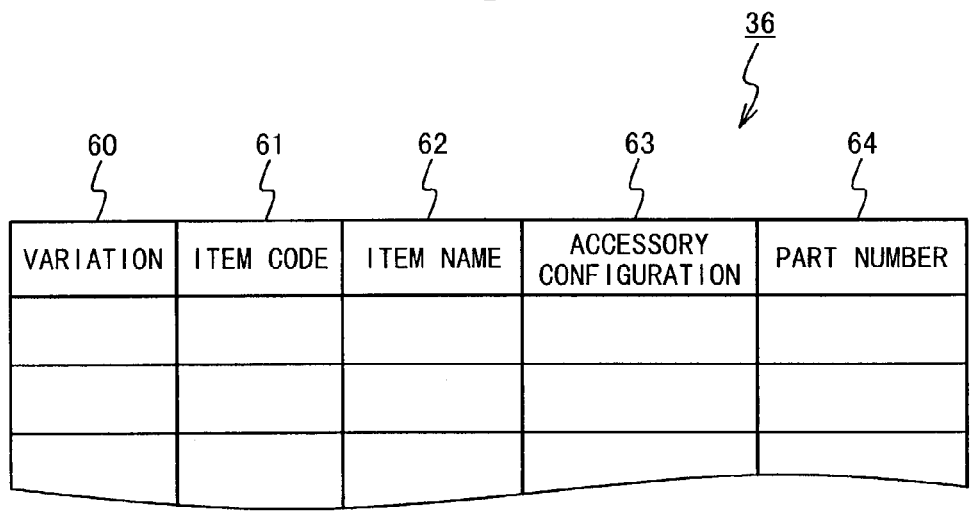
FIG. 4 shows the variation-specific parts list.

The variation-specific parts list 36 may have the structure shown in FIG. 4 in the accessory database 14. The variation-specific parts list 36 includes a product variation section 60, an item number section 61, an item name section 62, an accessory configuration section 63, and a part number section 64.

The product variation section 60 represents product variation codes to identify product variations. The product variation codes described in the product variation section 34 of the product variation table 31 are listed on the product variation section 60.

The item number section 61 represents item numbers of items that include parts listed on the variation-specific parts list 36.

The item name section 62 represents item names of the items. The item names described in the item name section 41 shown in FIG. 3A are listed on the item name section 62.

The accessory configuration section 63 represents the possible combinations of variation-specific accessories. The accessory configuration section 63 corresponds to the accessory check section 39 shown in FIG. 3A.

The part number section 64 represents part numbers of parts included in the associated items.

CAD System

As shown in FIG. 1, the CAD system 3 is composed of a main system 3-1 and an input output unit 3-2. The main system 3-1 includes a CPU and a memory unit storing a CAD program 15 and a CAD database 16. The CAD system 3 operates on the basis of the CAD program 13 to produce part drawing data on parts included in automobiles in response to operation of the user. A part drawing datum of a part includes data on a part number of the part, a CAD data representative of three-dimensional (3D) drawing(s) of the part, a list of constituent parts that constitute the part, and so on. The CAD database 16 stores therein the part drawing data produced by the CAD program 13. A display screen of the input output device 3-2 displays the 3D drawing of the part on the basis of the part drawing data.

The CAD program 15 is designed to extract part property data representative of properties of parts from the part drawing data. The extracted part property data are outputted to the parts list system 4, and used for parts management in the parts list system 4.

Figure 5:
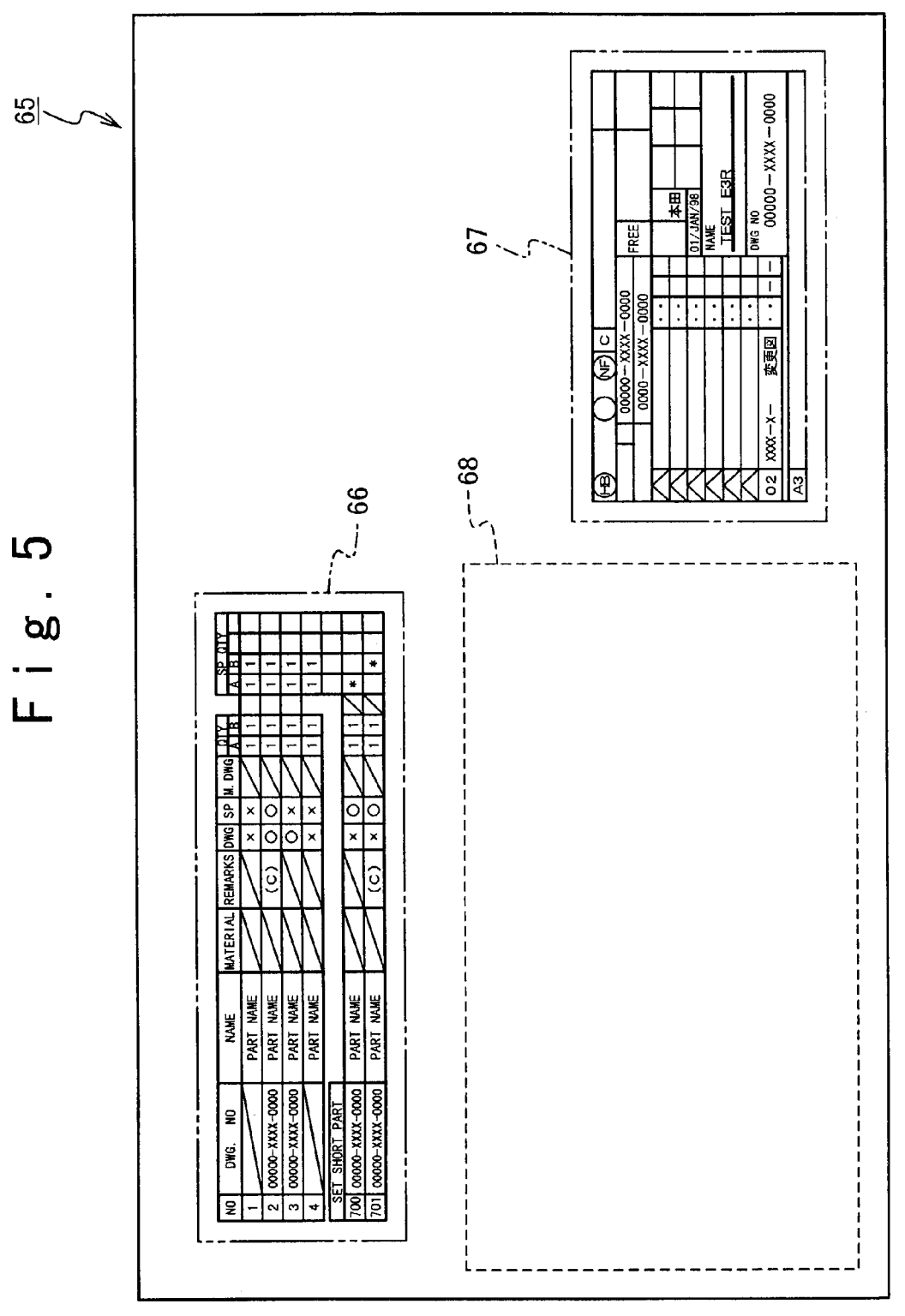

FIG. 5 shows a screen image of a specific part displayed on the basis of a part drawing datum associated to the part. The screen image is denoted by the numeral 65. The screen image 65 includes a constituent parts display region 66, a title region 67 and a 3D-drawing region 68.

The 3D-drawing region 68 shows a 3D drawing of the associated part.

The constituent parts property region 66 depicts a constituent parts list. The constituent parts list describes part numbers and names of the constituent parts of the specific part, and other data on the constituent parts.

The title region 67 depicts data identifying on the specific part, such as the part number and name of the part, the name of the item that the part belongs to.

The property data of the specific part may be extracted through the following procedure.

In advance, data on the properties of the parts and various data used for extracting the property data are prepared and stored in the CAD database 16. Data on the positions of the constituent parts property region 66 and the title region 67 is prepared and stored in the CAD database 16. In addition, data on the positions where the property data are described are prepared and stored in the CAD database 16 in advance. Data on the properties of the parts are respectively described in specific formats (such as fonts) in the constituent parts property region 66 and the title region 67. The data on the properties have different formats, and thus a datum relative to a property of the part can be identified by the format from other data.

The data on the properties of the associated part are queried in the constituent parts property region 66 and the title region 67 by using the specific format as a key to produce the property data of the part.

Figure 6:
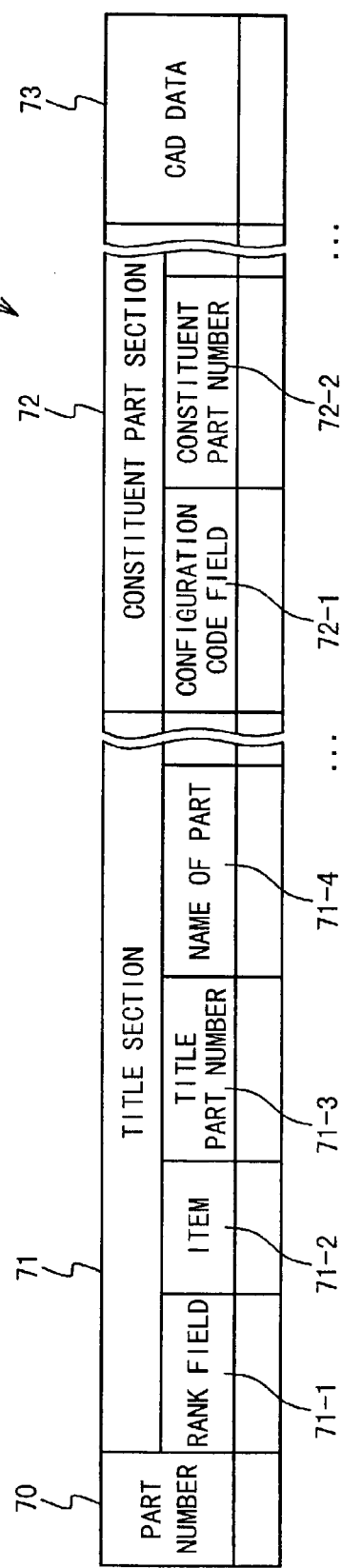
FIG. 6 shows the CAD database storing the part drawing data.

FIG. 6 shows the part drawing data stored in the CAD database 16. The part drawing data are denoted by the numeral 69 in FIG. 6. The part drawing data 69 respectively include part number sections 70, title sections 71, constituent parts sections 72, and CAD data sections 73.

The part number sections 70 respectively represent part numbers of the associated parts.

The title sections 71 represent data described in the title region 67 on the associated parts. The title sections 71 respectively include rank fields 71-1 representative of the ranks of the parts, item fields 71-2 representative of the items that the associated parts belongs to, title part number fields 71-3 representative of the part numbers of the associated parts, and part name fields 71-4 representative of the names of the parts.

The constituent parts sections 72 include data on the constituent parts of the associated parts, which are described in the constituent parts property region 66. The constituent parts sections 72 respectively include a configuration code field 72-1 representative of kinds of drawings, a constituent part number field 72-2 representative of part numbers of the constituent parts of the associated part.

The CAD data sections 73 respectively represent CAD data of the 3D drawings of the associated parts. It should be noted that a plurality of 3D drawings may be drawn for a part. In this case, the CAD data includes a plurality of 3D drawings for the part. Each of the 3D drawings is provided with a drawing number, which includes the part number of the associated part. When a plurality of 3D drawings are drawn for the associated part, the drawing numbers respectively include sequential drawing-identifying digits along with the part number. The sequential drawing-identifying numbers are used for checking the existence of the complete set of the 3D drawings of the part.

Parts List System

As shown in FIG. 1, the parts list system 4 is composed of a main system 4-1 and an input output unit 4-2. The main system includes a CPU and a memory unit storing a parts list management program 17 and a parts list database 18. The parts list database 18 contains the electronic parts list. The parts list system 4 operates on the parts list management program 17 to manage the electronic parts list. The parts list system 4 is equipped with a data association database 19 storing an association table that describes the association of the data on the electronic parts list to the data stored in the accessory database 14, and the CAD database 16. The data association database 19 is used for revising or correcting data to relieve the inconsistency of data stored in the databases.

The electronic parts list includes various data on the items and parts, such as item data representative of item numbers and names of the items, parts data representative of parts numbers and names of the parts constituting the respective items, parts association data representative of the association among the parts, parts status data representative of status of progress in designing each of the parts, parts installation data representative of which combinations of accessories each of the parts is to be installed for, part-specific data representative of properties specific to each of the parts, and part drawing link data representative of the association of part numbers listed in the electronic parts list to the CAD data stored in the aforementioned CAD database 16, which represent 3D drawings of the parts. The part-specific data typically include material, weight, volume, cost, analysis method to be used, and a desirable maker.

FIG. 7 shows an exemplary screen image of the electronic parts list displayed on the display screen of the input output device 4-2. The electronic parts list, which is denoted by the numeral 75, includes a part number section 76 and a part property section 77.

The part number section 76 shows information to identify the parts. The part number section 76 includes a number field 78, a rank field 79, a status field 80, a parts configuration field 81, an item/part name field 82.

The number field 78 depicts codes respectively provided for the parts in a predetermined rule.

The rank field 79 depicts the ranks of the parts.

The status field 80 depicts status of progress in designing of each of the parts.

The parts configuration field 81 depicts a part configuration tree representative of the hierarchical association of the items and the parts. For example, an item 81-1 identified by an item number "F01 20001" is associated to a part 81-2 whose rank is "1" (the highest rank). The part 81-2 is identified by a part number "20001-TGHA-A000". The association of the item 81-1 to the part 81-2 implies that the item 81-1 includes the part 81-2. The part 81-2 is associated to a part 81-3 whose rank is "2" (the second rank). The part 81-3 is identified by a part number "20001-TGHA-B000". The association of the part 81-2 to the part 81-3 implies that the part 81-2 includes the part 81-3. The same goes with respect to the lower ranks.

FIG. 8 shows the electronic parts list 75 in the parts list database 18. The electronic parts list stores therein various data on the parts. The electronic parts list typically includes a rank field 85 representative of ranks of the parts, a status field 86 representative of statuses of progresses in designing the parts, an item number field 87 representative of the item numbers of the associated items, an item name field 88 representative of the names of the items, a part number field 89 representative of the part numbers of the parts, the part name field 90 representative of the names of the parts, a part application data field 91 representative of which accessory each of the parts is to be applied to, a part property field 92 representative of the part-specific data, a configuration code field 93 representative of the kinds of the part drawings provided for the parts, and a constituent part number field 94 representative of parts numbers of the constituent parts of each of the parts.

The preparation of the data stored in the electronic parts list 75 is achieved by extracting necessary data from the part drawing data 69. As mentioned above, the extraction of the necessary data is executed by the CAD system 3, and the parts list system 4 receives the data to store in the electronic parts list. As mentioned above, the association of the data in the electronic parts list 85 to the data in the part drawing data 69 is described in the data association database 19.

It should be noted that the data stored in the electronic parts list shown in FIG. 8 corresponds to the data on the screen image shown in FIG. 7. The data stored in the rank field 85, the status field 86, the item number field 87, the item name field 88, the part number field 89, and the part name field 90 correspond to the data the part number section 76, that is, the data shown in the rank field 79, the status field 80, the parts configuration field 81, and the item/part name field 82. The data stored in the part application data field 91, the part property field 92, the configuration code field 93, the constituent part number field 94 correspond to the data shown in the part property section 77.

Data Check System

As shown in FIG. 1, the data check system 1 is composed of a main system 1-1, and an input output device 1-2. The main system 1-1 stores therein a set of computer programs for operation of the data check system 1. In addition, the main system 1-1 stores a check information database 12-1 and a part number regulation database 12-2. The check information database 12-1 contains information on conditions and regulations of the check executed by the data check system 1. The part number regulation database 12-2 stores the regulation of the part numbers. The part numbers used for the parts management are to be determined so as to comply with the regulation.

The computer programs stored in the main system 1-1 includes a premise check program 11-1, an item check program 11-2, a kind variation check program 11-3, a drawing lineup check program 11-4, a part number lineup check program 11-5, a latest revision check program 11-6 and a higher rank tracking program 11-7. The set of programs are used for checking whether data on a package specified by a user are correctly stored in the databases, especially with respect to part numbers.

In detail, the premise check program 11-1 checks whether the specified package satisfies a minimum condition to be checked in detail. The premise check program 11-1 typically checks the following: (A) whether part numbers described in the package comply with the regulation described in the part number regulation database 12-2 (for example, whether the part numbers are represented by alphanumeric characters according to a predetermined format, such as a set of hyphenated alphanumeric characters of n digits, m digits, and p digits); (B) whether the data of the specified package is used in a different program; and (C) whether the parts that constitute the specified package are contained in a different package. Subjects to be checked by the premise check program 11-1 are described in the check information database 12-1. When the premise check program 11-1 finds any error during the check, the premise check program 11-1 produces a warning.

The item check program 11-2 checks data on a specified item. In detail, the item check program 11-2 checks whether the parts listed on the item sheets 36a of the variation-specified parts list 36, which is stored in the accessory management system 2, are listed as the parts of the "highest rank" in the electronic parts list 75. When a part number listed on the item sheets 36a is specified, the item check program 11-2 queries the rank of the specified part in the electronic parts list 75, and checks whether the rank of the specified part is the "highest rank". When the item check program 11-2 finds any error during the check, the item check program 11-2 produces a warning.

The kind variation check program 11-3 checks whether different packages include a part of the same kind as the parts of the specified package. As mentioned above, two ore more parts of the same kind are prohibited from being included in different packages. This is confirmed by the check executed by the kind variation check program 11-3 on the basis of the kind-specifying digits of the part numbers listed on the electronic parts list 75. When the kind variation check program 11-3 finds any error during the check, the kind variation check program 11-3 produces a warning.

The drawing lineup check program 11-4 checks whether a complete set of drawings of parts included in the specified package are provided in the CAD database 16. As mentioned above, a part may be drawn in a plurality of part drawings to precisely exhibit the structure thereof. The drawing lineup check program 11-4 checks whether the necessary drawings are surely stored. When the drawing lineup check program 114 finds any error during the check, the drawing lineup check program 11-4 produces a warning.

The part number lineup check program 11-5 produces "part number structure" representative of the association of the parts on the basis of the electronic parts list 75. When the constituent part number section 94 in the electronic parts list 75 describes that a specific part includes constituent parts, the part number lineup check program 11-5 recognizes that a "relation" exists between the specified part and each of the constituent parts. The part number lineup check program 11-5 finds all the relations included in the package. The part number lineup check program 11-5 defines the complete set of the relations as being the "part number structure".

While producing the "part number structure", the part number lineup check program 11-5 checks whether the constituent parts of a specific part are surely listed on the part number section 89 of the electronic parts list 75. If any of the constituent parts of a specific part is not listed on the part number section 89, the part number lineup check program 11-5 recognizes it as an error, and produces a warning.

The latest revision check program 11-6 executes a revision check to prove whether only the parts revised most lately are listed in the electronic parts list 75. Parts of old versions are confusing for the parts management, and thus the data on the parts of old versions should be erased. As mentioned above, the part numbers include the version-specifying digits, and the revision check is executed on the basis of the version-specifying digits. The latest revision check program 11-6 deletes the data on the part(s) that is not revised most lately.

The higher rank tracing program 11-7 checks the "part number structure" produced by the part number lineup check program 11-5. When the part numbers are correctly assigned to the parts and the constituent part number section 94 correctly describes part numbers of the constituent parts, the "part number structure" is represented by a tree, and any of the parts included in the package is to be associated to a part of the "highest" rank through relations. If any one of the parts included in the package is not associated to the part of the "highest" rank through one or more relations, it means that the "part number structure" is not correct, and the higher rank tracing program 11-7 produces a warning.

For example, when relations among a plurality of parts form a loop, it means that those parts are not associated to the part of the "highest" rank. When the higher rank tracing program 11-7 finds the loop of the relations, the higher rank tracing program 11-7 produces a warning.

Data Check Procedure

Figure 9:
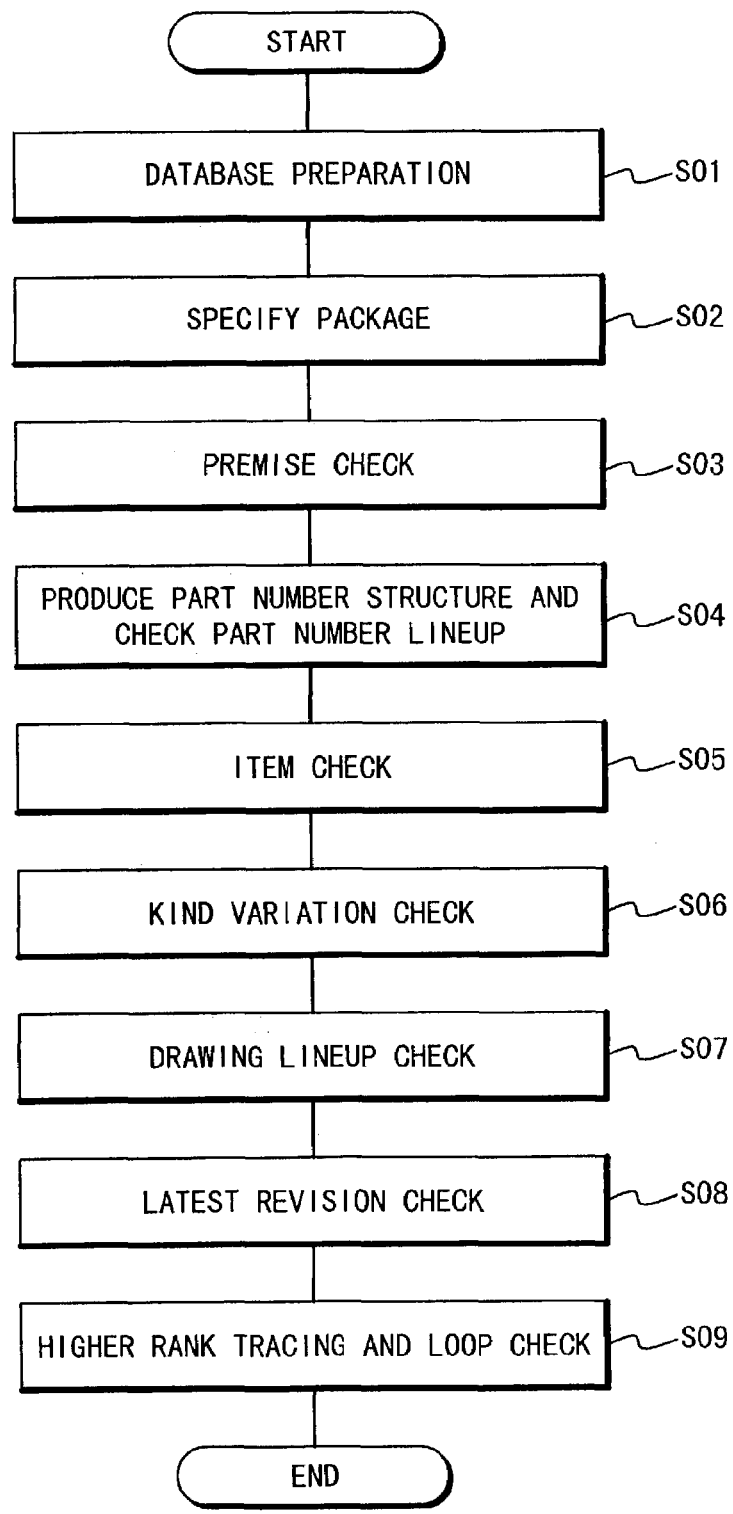
FIG. 9 shows a data check procedure.

FIG. 9 is a flowchart showing the data check procedure executed by the data check system 1.

Step S01

The accessory database 14, the CAD database 16, the parts list database 18 are prepared at Step S01.

The preparation of the accessory database 14 is achieved through the following process. The user is requested to input type codes, model codes and specifications of the automobiles specified thereby. The accessory specification table 26, shown in FIG. 2A, is produced on the basis of the inputted type codes, model codes and specifications. The product variation table 31 is then generated on the basis of the accessory specification table 26. The variation-specific parts list 36 is then generated on the basis of the accessory specification table 26. The parts listed in the variation-specific parts list 36 are to be ranked as the "highest rank". The accessory specification table 26, the product variation table 31, and the variation-specific parts list 36 are stored in the accessory database 14.

The part drawing data 69 to be stored in the CAD database 16 are generated with the CAD platform provided by the CAD system 3. The 3D drawings of the respective parts, including the parts of lower ranks, are drawn by the user with the CAD system 3. The data on the constituent parts of the respective parts are attached to the 3D drawings to produce the part drawing data 69.

The user is requested to input the necessary data for the parts list database 18. The preparation of the parts list database 18 is partially achieved by the CAD system 3 through extracting the part property data from the part drawing data in the CAD database 16. The parts list management program 17 generates the data association database 19 that contains the data association table describing the association of the data stored in the parts list database 18 to the data stored in the CAD database 16. When the data stored in the electronic parts list 75 is modified, the data in the CAD database 16 associated to the modified data are also modified with reference to the data association table.

Step S02

A package to be checked is specified. The package to be checked may be specified by the package number inputted by the user, or may be newly produced by grouping a plurality of parts. A list of the parts that constitutes the package is stored in the check information database 12-1.

Step S03

The premise check program 11-1 determines whether the packaged data satisfies the minimum condition to deserve detailed data check.

The premise check program 11-1 checks the following three subjects. First, the premise check program 11-1 checks whether the part numbers of the parts included in the specified package comply with the part number regulation stored in the part number regulation database 12-2. For example, the premise check program 11-1 checks whether the part numbers are represented by a predetermined format, such as a set of three codes respectively consisting of n digits, m digits, and p digits hyphenated alphanumeric characters.

Second, the premise check program 11-1 checks whether the data on the specified package is used in a different program. This check may be achieved on the basis of the presence of a temporary file or checking flags representative of the state of the data.

Third, the premise check program 11-1 checks whether the parts that constitute the specified package are contained in other packages. Subjects to be checked by the premise check program 11-1 are described in the check information database 12-1. This check may be achieved by a cross-check of the part numbers of the parts included in the specified package and other packages Other checks may be done if necessary.

When the premise check program 11-1 finds any error during the check, the premise check program 11-1 produces a warning.

Step S04

The part number lineup check program 11-5 produces the "part number structure". The part number lineup check program 11-5 finds the aforementioned relations on the basis of the part number section 89 representative of the part numbers of the parts, and the constituent part number section 94 representative of the part numbers of the constituent parts associated to the respective parts. The complete set of the relations constitute the "part number structure".

While producing the "part number structure", the part number lineup check program 11-5 checks whether the constituent parts of the respective parts included in the specified package are surely listed on the part number section 89 of the electronic parts list 75. This check allows the consistency of the "part number structure" to be confirmed with respect to the direction from the parts of the higher ranks to those of the lower ranks.

Step S05

The item check program 11-2 checks whether the parts that constitute the respective item(s) are listed in the electronic parts list 75. The item check program 11-2 refers to the item sheets 36*a* of the variation-specific parts list 36 and obtains the part numbers of the parts that constitute the respective item(s) listed on the item sheets 36*a*. Then, the item check program 11-2 queries the obtained part numbers in the part number section 89 in the electronic parts list 75. When not finding the obtained part numbers in the electronic parts list 75, the item check program 11-2 produces a warning.

In addition, the item check program 11-2 checks whether the parts included in the variation-specified parts list 36 are ranked as the highest rank in the electronic parts list 75. If not so, the item check program 11-2 produces a warning.

These checks effectively maintain the consistency of the variation-specific parts list 36 and the electronic parts list 75.

Furthermore, the item check program 11-2 checks whether the part numbers of the parts of the highest rank include a portion of the item code of the item that includes the parts. For instance, with reference to FIG. 7, the item code of the item 81-1 is "F01 20001", the part number of the part 81-2 of the highest rank is "20001-TGHA-A000", and the part number of the part 81-3 of the highest rank is "20001-TGHA-B000". Both of the item code of the item 81-1 and the part number of the part 81-1 include "20001", and this means that the item code and the part number are assigned according to the part number regulation. If the part numbers of the parts of the highest rank do not include the portion of the item code of the item, the item check program 11-2 produces a warning.

Step S06

The kind variation check program 11-3 checks whether any part whose kind is the same as any one of the parts of the specified package is included in other packages. The check is executed on the basis of the kind-specifying digits of the part numbers listed in the part number section 89 of the electronic parts list 75. For example, the part number of the part 81-1 is "20001-TGHA-A000" and the "A000" comprises the kind-specifying digits. When finding a part in another packages whose part number includes the same kind-specifying digits "A000", the kind variation check program 11-3 produces a warning.

Step S07

The drawing lineup check program 11-4 checks whether the complete set of the drawings of the parts belonging to the specified package is stored in the CAD database 16.

This check may be achieved by using the drawing-identifying numbers provided with the drawings of the parts. For instance, let a part whose part number is "XXXX-YYYY-ZZZZ" be drawn in a plurality of drawings whose drawing numbers are "XXXX-YYYY-ZZZZ-AA", "AA" being sequential drawing-specifying numbers. The drawing lineup check program 11-4 queries the drawings whose drawing numbers includes "XXXX-YYYY-ZZZZ" in the CAD database 16. If the drawing numbers of the queried drawings do not complete a set of the sequential drawing-specifying numbers, or only one drawing is queried in the CAD database 16, the drawing lineup check program 11-4 produces a warning.

Step S08

The latest revision check program 11-6 check whether only the parts revised most lately are listed in the electronic parts list 75 and deletes unnecessary data from the electronic parts list 75.

The version-specifying digits of the part numbers are used for the check. The latest revision check program 11-6 lists the parts whose part numbers are the same except the version-specifying digits. For instance, let the low two digits of the part number be the version-specifying digits. With respect to the part 81-2 whose part number is "20001-

TGHA-A000", the "00" comprises its version-specifying digits. The latest revision check program 11-6 queries the parts whose part numbers include "20001-TGHA-A0". When the number in the version-specifying digits is increased every time the part is revised, the part whose number in the version-specifying digits is largest is the latest version. The latest revision check program 11-6 deletes data on the old version of the part from the electronic parts list 75 leaving the data on the latest version. This procedure removes the unnecessary data from the electronic parts list 75 and allows the electronic parts list 75 to be updated.

Step S09

The higher rank tracing program 11-7 checks the "part number structure" produced by the part number lineup check program 11-5. The part number lineup check program 11-5 derives the relations between any two of the parts on the basis of the electronic parts list 75. The higher rank tracing program 11-7 repeatedly traces the relations one by one from that part so that the ranks of the associated parts get higher. If the higher rank tracing program 11-7 reaches the part whose rank is the highest rank from each of the parts, it proves that the conformity of the "part number structure" is maintained. If one of the parts is not associated to the highest rank through a predetermined number or fewer of the relations, the higher rank tracing program 11-7 recognizes that the relations form a loop (that is, a constituent part of a specific part is ranked as a higher rank than the specific part), and produces a warning.

The aforementioned procedure allows the consistency and the conformity of data stored in the variation-specified parts list 36 and the electronic parts list 75 to be checked reliably and automatically.

Although the invention has been described in its preferred form with a certain degree of particularity, it is understood that the present disclosure of the preferred form maybe changed in the details of construction and the combination and arrangement of parts may be resorted to without departing from the spirit and the scope of the invention as hereinafter claimed. Especially, it should be noted that the parts management system may be used for part management of other apparatuses.

What is claimed is:

1. A part management system used for parts management of parts of an apparatus comprising:
    a database system including at least one database, wherein said at least one database stores data on said parts, said data including an electronic parts list describing part numbers for identifying said parts; and
    a data check computer system which checks whether said data stored in said at least one database complies with a predetermined rule, including checking at least one of the consistency and conformity of the part numbers described within the electronic parts list, and produces a warning in response to said checking;
    wherein: said parts are provided with ranks for hierarchical management,
    said database system includes an accessory management computer system for managing accessories of said apparatus,
    said accessory management computer system contains a variation-specific parts list which includes part numbers of variation-specific parts constituting a variation-specific accessory which is equipped for a variation of said apparatus to distinguish said variation from another variation of said apparatus, and
    said data check computer system looks up data on said variation-specific parts in said electronic parts list using said part numbers of said variation-specific parts as a query and determines whether said variation-specific parts are provided with the highest rank in said electronic part list, and produces said warning in response thereto.

2. A part management system according to claim 1, wherein said data check computer system includes a part number regulation database describing a part number regulation, and
    wherein said data check computer system checks whether said part numbers of said parts in said electronic parts list are described according to said part number regulation and produces said warning in response thereto.

3. A part management system, used for parts management of parts of an apparatus comprising:
    a database system including at least one database, wherein said at least one database stores data on said parts, said data including an electronic parts list describing part numbers for identifying said parts: and
    a data check computer system which checks whether said data stored in said at least one database complies with a predetermined rule, including checking at least one of the consistency and conformity of the part numbers described with the electronic parts list, and produces a warning in response to said checking,
    wherein each of said part numbers of said parts includes at least one kind-specifying digit representative of a kind thereof,
    said parts listed in said database system determines whether parts having part numbers including the same kind-specifying digit are included in different packages and produces said warning in response thereto.

4. The part management according to claim 1, wherein said database system includes a CAD database storing drawings of specific one of said parts,
    wherein said drawings are respectively provided with drawing numbers which includes a specific part number of said part number, and
    wherein said data check computer system determines whether said database system contains a complete set of said drawings based on said drawing numbers to produce said warning.

5. The part management system according to claim 1, wherein said electronic parts list comprises:
    a part number section describing part numbers of said parts; and
    a constituent part number section describing constituent part numbers of constituent parts of said parts, and
    wherein said data check system determines whether said part number section includes each of said constituent part numbers to produce said warning.

6. A parts management system , used for parts management of parts of an apparatus comprising:
    a database system including at least one database, wherein said at least one database stores data on said parts, said data including an electronic parts list describing part numbers for identifying said parts; and
    a data check computer system which checks whether said data stored in said at least one database complies with a predetermined rule, including checking at least one of the consistency and conformity of the part numbers described within the electronic parts list, and produces a warning in response to said checking, wherein said part numbers of said parts respectively include at least one version-specifying digit identifying a revised version of a specific part of said parts, and wherein said data check computer system queries an old version part number that is identical to a latest version part number of the latest version of said specific part except said at least one version-specifying digit, and deletes data on an old version of said specific part associated to said old version part number from said electronic parts list.

7. A part management system, used for parts management of parts of an apparatus comprising:

a database system including at least one database, wherein said at least one database stores data on said parts, said data including an electronic parts list describing part numbers for indentifying said parts; and a data check computer system which checks whether said data stored in said at least one database complies with a predetermined rule, including checking at least one of the consistency and conformity of the part numbers described within the electronic parts list, and produces a warning in response to said checking, wherein said electronic parts list includes:

a part number section describing part numbers of said parts; and a constituent part number section describing constituent part numbers of constituent parts of said parts, wherein said parts are provided with ranks such that each of said parts is provided with a higher rank than said constituent parts thereof, wherein said data check system produces a part number structure describing relations of said parts and said constituent parts thereof based on said part number section and said constituent part number section, and checks whether said part number structure correctly forms a tree, and produces said warning in response thereto.

8. The part management system according to claim 7, wherein said data check computer system traces said relations from each of said parts to determine whether each of said parts is associated through said relations to the part whose rank is the highest, and produces said warning in response thereto.

9. The part management system according to claim 7, wherein said data check computer system produces said warning when one of said parts is not associated to said highest rank part through a predetermined number or fewer of said relations.

10. A method for parts management of parts of an apparatus comprising:

preparing at least one database storing data on said parts, wherein said data includes an electronic parts list describing part numbers for identifying said parts;

automatically checking whether said data stored in said at least one database complies with a predetermined rule by a data check computer system, including checking at least one of the consistency and conformity of the part numbers described within the electronic parts list;

producing a warning in response to said checking;

providing said parts with ranks for hierarchical management;

providing a variation-specific parts list which includes part numbers of variation-specific parts constituting a variation-specific accessory which is equipped for a variation of said apparatus to distinguish said variation from another variation of said apparatus;

looking up data on said variation-specific parts in said electronic parts list using said part numbers of said variation-specific parts as a query by said data check computer system; and determining whether said variation-specific parts are provided with the highest rank in said electronic part list by said data check computer system, and said warning is produced in response thereto.

11. The method according to claim 10, further comprising the steps of:

providing a part number regulation database describing a part number regulation; and determining whether said part numbers of said parts in said electronic parts list are described according to said part number regulation by said data check computer system and said warning is produced in response thereto.

12. A method for parts management of parts of an apparatus comprising the steps of:

preparing at least one database storing data on said parts, wherein said data includes an electronic parts list describing part numbers for identifying said parts;

automatically checking whether said data stored in said at least one database complies with a predetermined rule by a data check computer system, including checking at least one of the consistency and conformity of the part numbers described within the electronic parts list; and producing a warning in response to said checking, wherein each of said part numbers of said parts includes at least one kind-specifying digit representative of a kind thereof, wherein said parts listed in said database system are packaged into a plurality of packages, and said method further comprising the steps of:

determining whether parts having part numbers including the same kind-specifying digit are included in different packages, and said warning is produced in response thereto.

13. The method according to claim 10, further comprising the steps of:

preparing a CAD database storing drawings of specific ones of said parts, wherein said drawings are respectively provided with drawing numbers which include a specific part number of said part number, and determining whether said database system contains a complete set of said drawings based on said drawing numbers by said data check computer system, and said warning is produced in response thereto.

14. The method according to claim 10, wherein said electronic parts list includes:

a part number section describing part numbers of said parts, and a constituent part number section describing constituent part numbers of constituent parts of said parts, and said method further comprising the steps of:

determining whether said part number section includes each of said constituent part numbers by said data check computer system, and said warning is produced in response thereto.

15. A method for parts management of parts of an apparatus comprising the steps of:

preparing at least one database storing data on said parts, wherein said data includes an electronic parts list describing part numbers for identifying said parts;

automatically checking whether said data stored in said at least one database complies with a predetermined rule by a data check computer system, including checking at least one of the consistency and conformity of the part numbers described within the electronic parts list; and producing a warning in response to said checking,
wherein said part numbers of said parts respectively include at least one version-specifying digit identifying a revised version of a specific part of said parts, and
said method further comprising the steps of:
querying an old version part number which is identical to a latest version part number of the latest version of said specific part except said at least one version-specifying digit; and
deleting data on an old version of said specific part associated to said old version part number from said electronic parts list.

16. A method for parts management of parts of an apparatus comprising the steps of:
preparing at least one database storing data on said parts, wherein said data includes an electronic parts list describing part numbers for identifying said parts;
automatically checking whether said data stored in said at least one database complies with a predetermined rule by a data check computer system, including at least one of the consistency and conformity of the part numbers described within the electronic parts list; and producing a warning in response to said checking,
wherein said electronic parts list includes:
a part number section describing part numbers of said parts;
a constituent part number section describing constituent part numbers of constituent parts of said parts, and
wherein said parts are provided with ranks such that each of said parts is provided with a higher rank than said constituent parts thereof, and
said method further comprising the steps of:
producing a part number structure describing relations of said parts and said constituent parts thereof based on said part number section and said constituent part number section, and
checking whether said part number structure correctly forms a tree, and said warning is produced in response thereto.

17. The method according to claim 16, further comprising the steps of:
tracing said relations from each of said parts, and
determining whether each of said parts is associated through said relations to the part whose rank is the highest, and said warning is produced in response thereto.

18. The method according to claim 16, wherein said part number structure producing step is executed when one of said parts is not associated to said highest rank part through a predetermined number or fewer of said relations.

19. A computer-readable program stored in a computer-readable comprising:
at least one database storing data on parts of an apparatus, said data including an electronic parts list describing part numbers for identifying said parts;
a data checker which automatically checks whether said data stored in said at least one database complies with a predetermined rule, including checking at least one of the consistency and conformity of the part numbers described within the electronic parts list;
an alarm section which produces a warning in response to said checking;
said parts are provided with ranks for hierarchical management;

said program further comprises a variation-specific parts list which includes part numbers of variation-specific parts constituting a variation-specific accessory which is equipped for a variation of said apparatus to distinguish said variation from another variation of said apparatus;
said data checker looks up data on said variation-specific parts in said electronic parts list using said part numbers of said variation-specific parts as a query; and
said data checker determines whether said variation-specific parts are provided with the highest rank in said electronic part list, and said alarm section produces said warning in response thereto.

20. The computer-readable program stored in a computer-readable medium according to claim 19, further comprising:
a part number regulation database describing a part number regulation; and
said data checker determines whether said part numbers of said parts in said electronic parts list are described according to said part number regulation, and said alarm section produces said warning in response thereto.

21. A computer-readable program stored in a computer-readable medium comprising:
at least one database storing data on parts of an apparatus, said data including an electronic parts list describing part numbers for identifying said parts;
a data checker which automatically checks whether said data stored in said at least one database complies with a predetermined rule, including checking at least one of the consistency and conformity of the part numbers described within the electronic parts list; and
an alarm section which produces a warning in response to said checking, wherein: each of said part numbers of said parts includes at least one kind-specifying digit representative of a kind thereof,
said parts listed in said database are packaged into a plurality of packages, and
said data checker determines whether parts having part numbers including the same kind-specifying digit are included in different packages, and said alarm section produces said warning in response thereto.

22. The computer-readable program stored in a computer-readable medium according to claim 19, further comprising:
a CAD database storing drawings of specific one of said parts, wherein said drawings are respectively provided with drawing numbers which include a specific part number of said part, and
said data checker determines whether said database system contains a complete set of said drawings based on said drawing numbers, and said alarm section produces said warning in response thereto.

23. The computer-readable program stored in a computer-readable medium according to claim 19, wherein said electronic parts list includes:
a part number section describing part numbers of said parts, and
a constituent part number section describing constituent part numbers of constituent parts of said parts, and
said data checker determines whether said part number section includes each of said constituent part numbers, and said alarm section produces said warning in response thereto.

24. A computer-readable program stored in a computer-readable medium comprising:
  at least one database storing data on parts of an apparatus, said data including an electronic parts list describing part numbers for identifying said parts;
  a data checker which automatically checks whether said data stored in said at least one database complies with a predetermined rule, including checking at least one of the consistency and conformity of the part numbers described within the electronic parts list; and
  an alarm section which produces a warning in response to said checking, wherein
  said part numbers of said parts respectively include at least one version-specifying digit identifying a revised version of a specific part of said parts, and
  said computer-readable program further comprising:
    a query section which queries an old version part number which is identical to a latest version part number of the latest version of said specific part except said at least one version-specifying digit, and
    deletes data on an old version of said specific part associated to said old version part number from said electronic parts list.

25. A computer-readable stored in a computer-readable medium program comprising:
  at least one database storing data on parts of an apparatus, said data including an electronic parts list describing part numbers for identifying said parts;
  a data checker which automatically checks whether said data stored in said at least one database complies with a predetermined rule, including checking at least one of the consistency and conformity of the part numbers described within the electronic parts list; and
  an alarm section which produces a warning in response to said checking, wherein said electronic parts list includes:
  a part number section describing part numbers of said parts;
  a constituent part number section describing constituent part numbers of constituent parts of said parts, and
  wherein said parts are provided with ranks such that each of said parts is provided with higher ranks than said constituent parts thereof, and
  said data checker produces a part number structure describing relations of said parts and said constituent parts thereof based on said part number section and said constituent part number section, and
  checks whether said part number structure correctly forms a tree, and said alarm section produces said warning in response thereto.

26. The computer-readable program stored in a computer-readable medium according to claim 25, wherein:
  said data checker traces said relations from each of said parts, and
  determines whether each of said parts is associated through said relations to the part whose rank is the highest, and said alarm section produces said warning in response thereto.

27. The computer-readable program stored in a computer-readable medium according to claim 25 wherein said data checker produces said part number structure when one of said parts is not associated to said highest rank part through a predetermined number of fewer of said relations.

* * * * *